US012598345B2

(12) United States Patent
Loughman et al.

(10) Patent No.: US 12,598,345 B2
(45) Date of Patent: Apr. 7, 2026

(54) DISPLAYING ON-SCREEN INFORMATION

(71) Applicant: TiVo Platform Technologies LLC, San Jose, CA (US)

(72) Inventors: Enda Loughman, Galway (IE); Michael Buckley, Offaly (IE)

(73) Assignee: TiVo Platform Technologies LLC, San Jose, CA (US)

( * ) Notice: Subject to any disclaimer, the term of this patent is extended or adjusted under 35 U.S.C. 154(b) by 83 days.

(21) Appl. No.: 18/532,482

(22) Filed: Dec. 7, 2023

(65) Prior Publication Data

US 2025/0193479 A1     Jun. 12, 2025

(51) Int. Cl.
| | |
|---|---|
| *H04N 21/431* | (2011.01) |
| *G06F 3/16* | (2006.01) |
| *G06V 20/70* | (2022.01) |
| *H04N 21/45* | (2011.01) |
| *H04N 21/4722* | (2011.01) |

(52) U.S. Cl.
CPC ......... *H04N 21/4316* (2013.01); *G06F 3/167* (2013.01); *G06V 20/70* (2022.01); *H04N 21/4532* (2013.01); *H04N 21/4722* (2013.01)

(58) Field of Classification Search
CPC ........... H04N 21/4316; H04N 21/4532; H04N 21/4722; G06F 3/167; G06V 20/70
See application file for complete search history.

(56) References Cited

U.S. PATENT DOCUMENTS

| | | | | |
|---|---|---|---|---|
| 10,440,435 | B1 * | 10/2019 | Erdmann ........... | H04N 21/4122 |
| 2018/0357317 | A1 * | 12/2018 | Santiago ............ | H04N 21/4828 |
| 2022/0368979 | A1 * | 11/2022 | Zhang .................... | G06V 20/41 |
| 2024/0192770 | A1 * | 6/2024 | Maschmeyer .......... | G06F 3/013 |
| 2024/0223861 | A1 * | 7/2024 | Yang .................. | H04N 21/4722 |

* cited by examiner

*Primary Examiner* — Kyu Chae
(74) *Attorney, Agent, or Firm* — Lerner David LLP

(57) ABSTRACT

Generally disclosed herein is a mechanism to display information on persons or objects appearing in media content on a display screen, without obscuring the persons or object. An annotation may be displayed in connection with the particular person or object to indicate that the information for the person or object is available. The viewer may request the information relating to the person or object by interacting with the content, such as by clicking on an icon, clicking on the person or object, submitting a voice search query, etc. In response to the viewer's request, the information may be displayed on the display screen, such as on an overlay display. According to some examples, a least obscuring region for displaying the information while the media content is still being played may be determined, such that the information can be displayed with minimal interruption to the viewer or other viewers.

20 Claims, 7 Drawing Sheets

DISPLAYING ON-SCREEN INFORMATION

BACKGROUND

Viewers of media content may not know the person appearing in the content, especially as social media has provided a platform for more people to become famous and appear in such content. Searching the Internet for information on a person appearing in content can be cumbersome. For example, the viewer would need to pause the content or risk missing it, while they performed the search. Moreover, it can be difficult to figure out the appropriate search terms to enter to find the person appearing in the content or to know when the correct search result is reached.

BRIEF SUMMARY

Generally disclosed herein is a mechanism to display information on persons or objects appearing in media content on a display screen, without obscuring the persons or object. An annotation may be displayed in connection with the particular person or object to indicate that the information for the person or object is available. For example, the person or object can be highlighted, an icon can be displayed near the person or object, or they may be surrounded by a bounding box, etc. The viewer may request the information relating to the person or object by interacting with the content, such as by clicking on an icon, clicking on the person or object, submitting a voice search query, etc. In response to the viewer's request, the information may be displayed on the display screen, such as on an overlay display. According to some examples, a least obscuring region for displaying the information while the media content is still being played may be determined, such that the information can be displayed with minimal interruption to the viewer or other viewers.

An aspect of the disclosure provides a system for providing details about a person or object depicted in media content while media content is being played. The system includes memory and one or more processors configured to identify one or more persons or objects of interest depicted in the media asset; generate for display annotations related to the identified one or more persons or objects of interest, wherein the annotations indicate that details related to the one or more persons or objects are available; receive a request from a user for the details; access the details while the media content continues to play; determine a region for a display of the details, wherein the region excludes areas that obscure a view of a viewer; and, display the search results in the determined region while the media content continues to play.

Another aspect of the disclosure provides a method for providing details about a person or object depicted in media content while media content is being played, the method comprises identifying one or more persons or objects of interest depicted in the media asset; generating for display annotations related to the identified one or more persons or objects of interest, wherein the annotations indicate that details related to the one or more persons or objects are available; receiving a request from a user for the details; accessing the details while the media content continues to play; determining a region for a display of the details, wherein the region excludes areas that obscure a view of a viewer; and, displaying the search results in the determined region while the media content continues to play.

The above and other aspects of the disclosure can include one or more of the following features. In some examples, aspects of the disclosure provide for all of the following features in combination.

In an example, generating the annotations comprises identifying a region within the media content, relative to the person or objects, wherein the region minimally obscures the one or more persons or objects of interest and other persons or objects; and positioning the annotations in the region.

In another example, generating the annotations comprises selecting an icon based on relevance to the one or more persons or objects.

In yet another example, the annotations include icons, bounding boxes and segmentation maps.

In yet another example, the one or more persons or objects of interest are determined based on the user's preference data.

In yet another example, the one or more persons or objects of interest are determined using an object recognition technique within a frame selected by the user's pressing a pause button on a remote controller.

In yet another example, the search results are personalized based on the user's historical data.

In yet another example, the region for display is dynamically adjusted as the plurality of frames changes to another frame based on locations of the one or more persons or objects, background objects and a gaze direction of the user.

In yet another example, the search query comprises a voice command.

In yet another example, the search query is received using an interactive display system.

Yet another aspect of the disclosure provides a non-transitory computer-readable medium storing instructions executable by one or more processors for performing a method for providing details about a person or object depicted in media content while media content is being played, the method comprising: identifying one or more persons or objects of interest depicted in the media asset; generating for display annotations related to the identified one or more persons or objects of interest, wherein the annotations indicate that details related to the one or more persons or objects are available; receiving a request from a user for the details; accessing the details while the media content continues to play; determining a region for a display of the details, wherein the region excludes areas that obscure a view of a viewer; and displaying the search results in the determined region while the media content continues to play.

DETAILED DESCRIPTION

The present disclosure provides a system and method for readily displaying information about a person or object depicted in media content without obscuring the media content or congesting the display area of the screen. The information may be retrieved and displayed without pausing the media content.

Annotations, such as text, graphical icons, bounding boxes, segmentation maps, etc., may be displayed during playback of the media content to highlight that additional information for a particular person or object is available. For example, icons, numbers, letters, or other symbols may be displayed next to the object or persons of interest. In some examples, the icons may highlight a field or occupation of the person on the display screen. The viewer may select the annotation to obtain information about the person associated with the annotation.

The information may include details about the person on the display screen. The level of detail or themes of the information may be dynamically modified according to the interest of the viewer.

Figure 1:
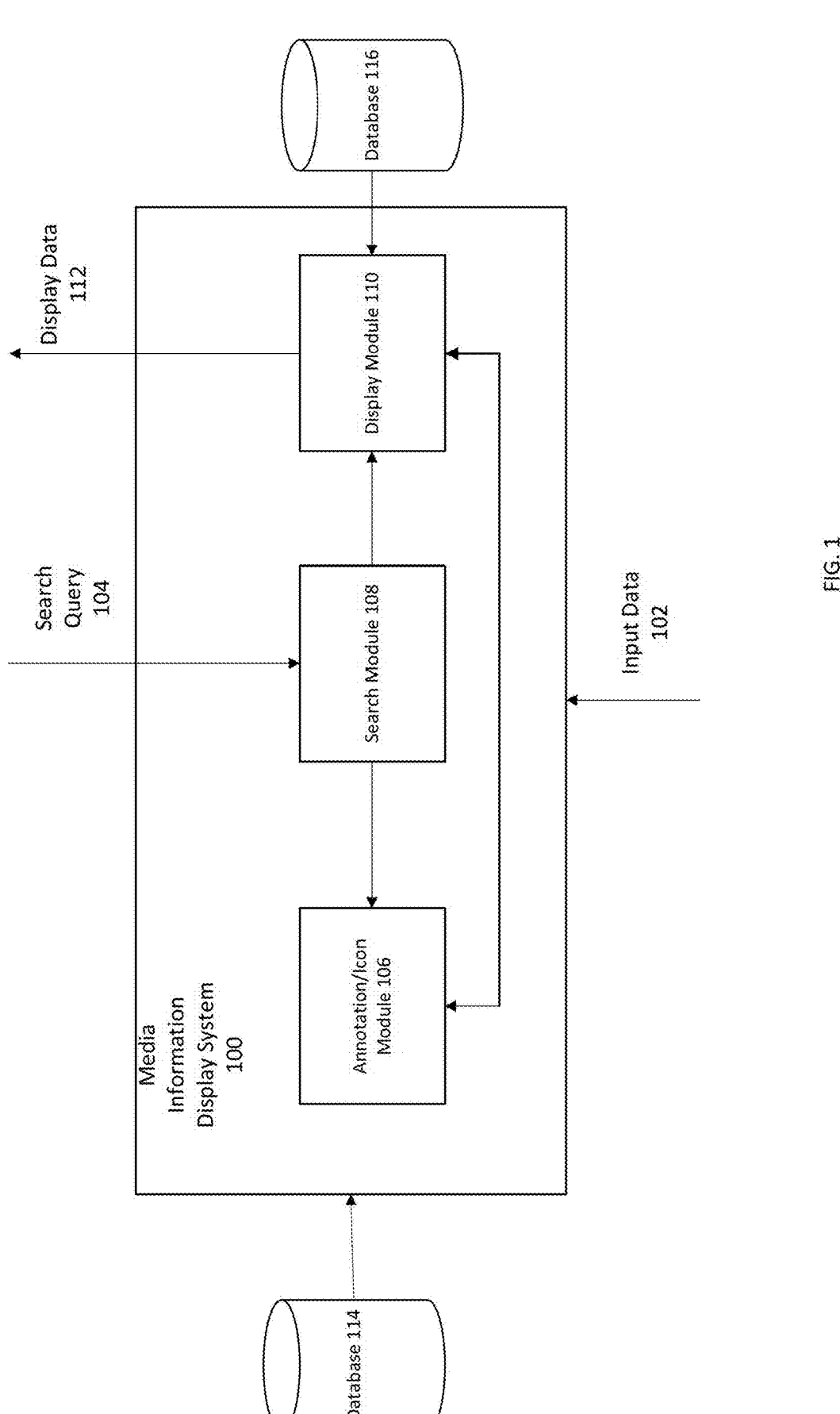
FIG. 1 depicts a block diagram illustrating a media information display system according to aspects of the disclosure.

FIG. 1 depicts a block diagram illustrating a media information display system 100. Media information display system 100 may receive the media content information and determine whether characters or objects appearing in the media content have sufficient information available such that annotations should be added for the characters or objects. Media information display system 100 may also receive the viewer information such as viewer's historical and preference data. Media information display system 100 may include annotation/icon module 106, search module 108, and display module 110. Annotation/icon module 106 may select objects or characters of interest and add annotation next to such objects or characters, indicating that additional information is available. Search module 108 may receive a request from the viewer for the additional information. Display module 110 may display the annotations/icons on an overlay display or display the additional information that the viewer has requested.

According to some examples, the media information display system 100 may receive the information relating to media content. Media information display system 100 may receive metadata containing information about context, genre, main persons, or objects of the media content. For example, media information display system 100 may determine whether media content is about movies, TV shows, documentaries, or live sports games, etc. based on the received metadata. Media information display system 100 may retrieve the viewer's information from database 114. Viewer information may also include historical information such as the history of the viewer's interactions with the media asset in the past, such as when and how the viewer stopped or paused the media asset and attempted to query certain additional information. Viewer information may further include information related to the viewer's personal interest, hobbies, occupation, education, and certain demographic information that can be used to identify objects or persons of interest appearing in the media asset. Media information display system 100 may determine whether the viewer has a specific interest in particular objects or persons appearing in the media content. If the viewer has a specific interest in particular objects or persons, media information display system 100 may annotate such objects or persons using annotation/icon module 106.

Once particular objects or persons are annotated or displayed with certain icons placed nearby, the viewer may interact with the display system by touching the icon or providing a search query by referring to the displayed icons or annotations when the viewer wants to request detailed information. Once search module 108 receives the viewer's touching or voice query, search module 108 may send such information to display module 110. Display module 110 may retrieve the detailed information from database 116. Display module 110 may output and display the retrieved detailed information as display data 112.

As a more detailed example, annotation/icon module 106 may receive metadata and frame information about a sports game (e.g. soccer game). Annotation/Icon module 106 may identify one or more soccer players. Media information display system 100 may receive the viewer information from database 114 as described above. The viewer may be a great fan of soccer player A. The viewer information may also reveal that the viewer has a great interest in the design and brand of soccer shoes. For example, the viewer information may contain the viewer's browsing history indicating that the viewer shops for shoes or follow influences that promote different shoes. In other examples, the system may utilize a voice recognition system to analyze the viewer's utterance such as "Oh look at his shoes!". Annotation/Icon module 106 may generate an annotation or icon indicating that detailed information on soccer player A is available. An icon depicting soccer shoes may also be generated. Any other mark such as question or exclamation mark or particular symbols or letters may also be generated. The generated annotation or icon may be sent to display module 110. Display module 110 may display the annotation or icon next to soccer player A when player A appears on the display screen. The displayed annotation or icon may be displayed on an overlay display. The overlay display may be displayed in the region that does not obscure soccer player A on the display screen. The icon depicting soccer shoes may continuously be displayed while soccer player A appears on the display screen. If soccer player A reappears on the display screen, the icon may be re-displayed.

When the viewer sees the icon depicting the soccer shoes, the viewer may want to receive additional information about the soccer shoes. The viewer may want to see the design, brand, and size of the soccer shoes that the soccer player is wearing. The viewer may speak a voice command such as "Tell me more about those soccer shoes". Search module 108 may receive the voice search query and analyze the search query by segmenting the audible portions of the voice query. The segmented portions of the query may be sent to display module 110. Display module 110 may retrieve additional information relating to the soccer shoes. Display module 110 may display the retrieved additional information and display the summary of the retrieved information on an overlay display on the display screen without pausing the playback of the soccer game. The overlay display may be placed away from soccer player A so as not to obscure soccer player A.

Figure 2:
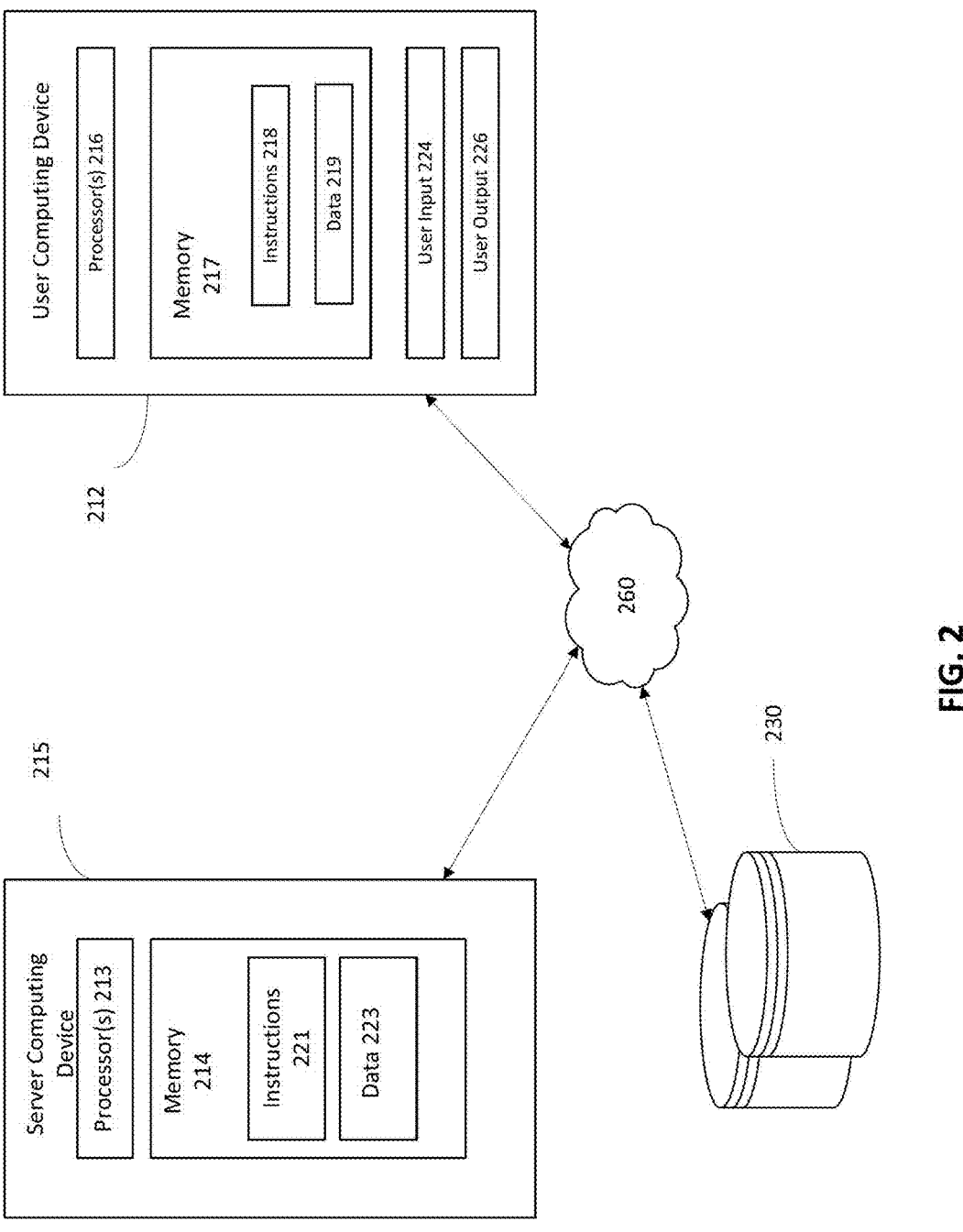
FIG. 2 depicts a block diagram illustrating example components of a media information display system according to aspects of the disclosure.

FIG. 2 depicts a block diagram illustrating example components of a media information display system. User computing device 212 may include a television, mobile computing device, or other user device with a display that can be adapted to display media content. Server computing device 215 may be a component of media information display system 100 illustrated in FIG. 1. Server computing device 215 may provide the media content to the user computing device 212 for display. Server computing device 215 may further provide annotations correlated with the media content. For example, the annotations may refer to persons or objects depicted in the media content and may indicate that further information regarding the persons or content is available. User computing device 212 may transmit a request from a viewer to server computing device to view the information. Storage devices 230 may store further information regarding the persons or content. In response to receiving the request, server computing device 215 may retrieve further information from storage devices 230. The retrieved information may be displayed in a non-obtrusive manner in relation to the media content on display of user computing device 212.

User computing device 212 and the server computing device 215 can be communicatively coupled to one or more storage devices 230 over a network 260. The storage device(s) 230 can be a combination of volatile and non-volatile memory and can be at the same or different physical locations than the computing devices 212, 215. For example, the storage device(s) 230 can include any type of non-transitory computer-readable medium capable of storing information, such as a hard-drive, solid state drive, tape drive, optical storage, memory card, ROM, RAM, DVD, CD-ROM, write-capable, and read-only memories.

The server computing device 215 can include one or more processors 213 and memory 214. Memory 214 can store information accessible by the processor(s) 213, including instructions 221 that can be executed by the processor(s) 213. Memory 214 can also include data 223 that can be retrieved, manipulated, or stored by the processor(s) 213. Memory 214 can be a type of non-transitory computer-readable medium capable of storing information accessible by the processor(s) 213, such as volatile and non-volatile memory. The processor(s) 213 can include one or more central processing units (CPUs), graphic processing units (GPUs), field-programmable gate arrays (FPGAs), and/or application-specific integrated circuits (ASICs), such as tensor processing units (TPUs).

Instructions 221 can include one or more instructions that when executed by the processor(s) 213, cause the one or more processors to perform actions defined by the instructions. Instructions 221 can be stored in object code format for direct processing by the processor(s) 213, or in other formats including interpretable scripts or collections of independent source code modules that are interpreted on demand or compiled in advance. Instructions 221 can include instructions for implementing processes consistent with aspects of this disclosure. Such processes can be executed using the processor(s) 213, and/or using other processors remotely located from the server computing device 215.

The data 223 can be retrieved, stored, or modified by the processor(s) 213 in accordance with instructions 221. Data 223 can be stored in computer registers, in a relational or non-relational database as a table having a plurality of different fields and records, or as JSON, YAML, proto, or XML documents. Data 223 can also be formatted in a computer-readable format such as, but not limited to, binary values, ASCII, or Unicode. Moreover, data 223 can include information sufficient to identify relevant information, such as numbers, descriptive text, proprietary codes, pointers, references to data stored in other memories, including other network locations, or information that is used by a function to calculate relevant data.

User computing device 212 can also be configured similar to the server computing device 215, with one or more processors 216, memory 217, instructions 218, and data 219. The user computing device 212 can also include a user output 226, and a user input 224. The user input 224 can include any appropriate mechanism or technique for receiving input from a user, such as a keyboard, mouse, mechanical actuators, soft actuators, touchscreens, microphones, and sensors.

Server computing device 215 can be configured to transmit data to the user computing device 212, and the user computing device 212 can be configured to display at least a portion of the received data on a display implemented as part of the user output 226. The user output 226 can also be used for displaying an interface between the user computing device 212 and the server computing device 215. The user output 226 can alternatively or additionally include one or more speakers, transducers or other audio outputs, a haptic interface or other tactile feedback that provides non-visual and non-audible information to the platform user of the user computing device 212.

Although FIG. 2 illustrates the processors 213, 216 and the memories 214, 217 as being within the computing devices 215, 212, components described in this specification, including the processors 213, 216 and the memories 214, 217 can include multiple processors and memories that can operate in different physical locations and not within the same computing device. For example, some of the instructions 221, 218 and the data 223, 219 can be stored on a removable SD card and others within a read-only computer chip. Some or all of the instructions and data can be stored in a location physically remote from, yet still accessible by, the processors 213, 216. Similarly, processors 213, 216 can include a collection of processors that can perform concurrent and/or sequential operations. Computing devices 215, 212 can each include one or more internal clocks providing timing information, which can be used for time measurement for operations and programs run by computing devices 215, 212.

The server computing device 215 can be configured to receive requests to process data from the user computing device 212. For example, environment 200 can be part of a computing platform configured to provide a variety of services to users, through various user interfaces and/or APIs exposing the platform services. One or more services may be searching for additional information related to certain objects or persons appearing in media assets. The user computing device 212 may receive and transmit data related to individual viewer's profile information and data related to the viewer's interests or hobbies and certain historical data, etc.

Devices 212, 215 can be capable of direct and indirect communication over network 260. Devices 212, 215 can set up listening sockets that may accept an initiating connection for sending and receiving information. The network 260 itself can include various configurations and protocols including the Internet, World Wide Web, intranets, virtual private networks, wide area networks, local networks, and private networks using communication protocols proprietary to one or more companies. Network 260 can support a variety of short- and long-range connections. The network 260, in addition, or alternatively, can also support wired connections between devices 212, 215, including over various types of Ethernet connection.

Although a single server computing device 215 and user computing device 212 are shown in FIG. 2, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Figure 3:
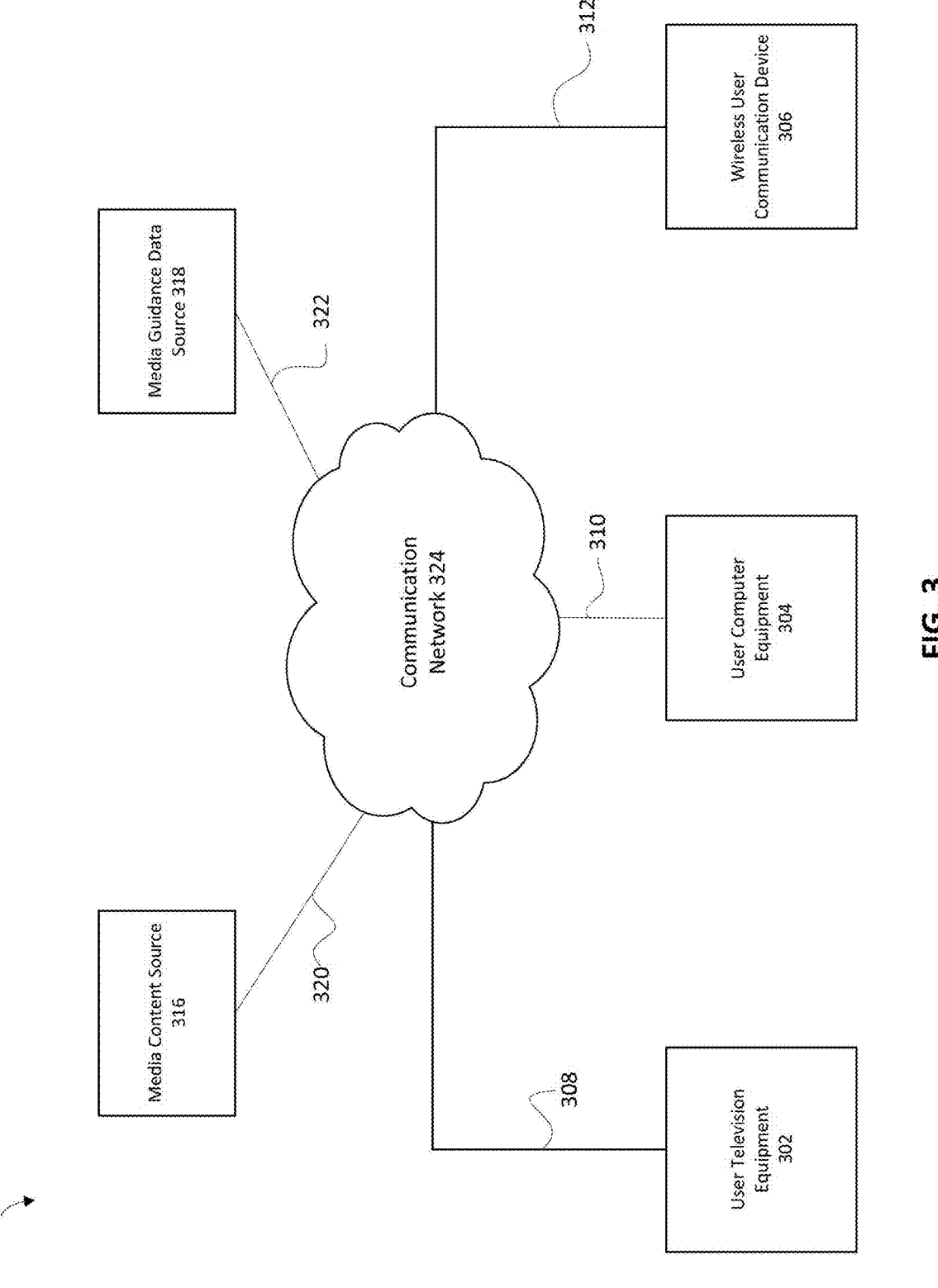
FIG. 3 depicts a block diagram illustrating an example media system according to aspects of the disclosure.

FIG. 3 depicts a block diagram illustrating an example media system 300. Media system 300 may include user television equipment 302, user computer equipment 304, wireless user communication device 306, media content source 316, and media guidance data source 318 are coupled to communication network 324 via paths 308, 310, 312, 320, and 322. User television equipment 302, user computer equipment 304, and wireless user communication device 306 may comprise one or more user computing devices 212 as illustrated in FIG. 2. Media content source 316 and media guidance data 318 may comprise one or more server computing devices 215 as illustrated in FIG. 2. User computer equipment 304 and user television equipment 302 may be Internet-enabled and allow for access to Internet content. User computer equipment 304 may include a tuner allowing for access to television programming. A media guidance application may be tailored to the display capabilities of both user computer equipment 304 and user television equipment 302. For example, on user computer equipment 304, the guidance application may be provided as a website accessed by a web browser. Paths 308, 310, 312, 320, and 322 may include one or more communication paths, such as a satellite path, a fiber-optic path, a cable path, a path that supports internet communication or any other suitable wired or wireless communication path or a combination of such paths.

Media content source 315 may include one or more types of content distribution equipment including a television distribution facility, cable system headend, satellite distribution facility, programming source, intermediate distribution facilities and/or server, internet providers, on-demand media server, and other content providers. Media content source 516 may include cable sources, satellite providers, on-demand providers, Internet providers, over-the-top content providers, or other providers of content. Media guidance data source 318 may provide media guidance data. Media guidance data may include an interactive television program guide that receives program guide data via a data feed. The media guidance data may also include viewer data. For example, the viewer data may include current and/or historical user activity information such as what content the user typically watches, what times of day the user watches content, whether the user interacts with a social network, at what times the user interacts with a social network to post information, what types of content the user typically watches, etc. The media guidance data may further include subscription data. The subscription data may identify to which sources or services a given user subscribes and/or to which sources or services the given user has previously subscribed but later terminates access.

Figure 4A:
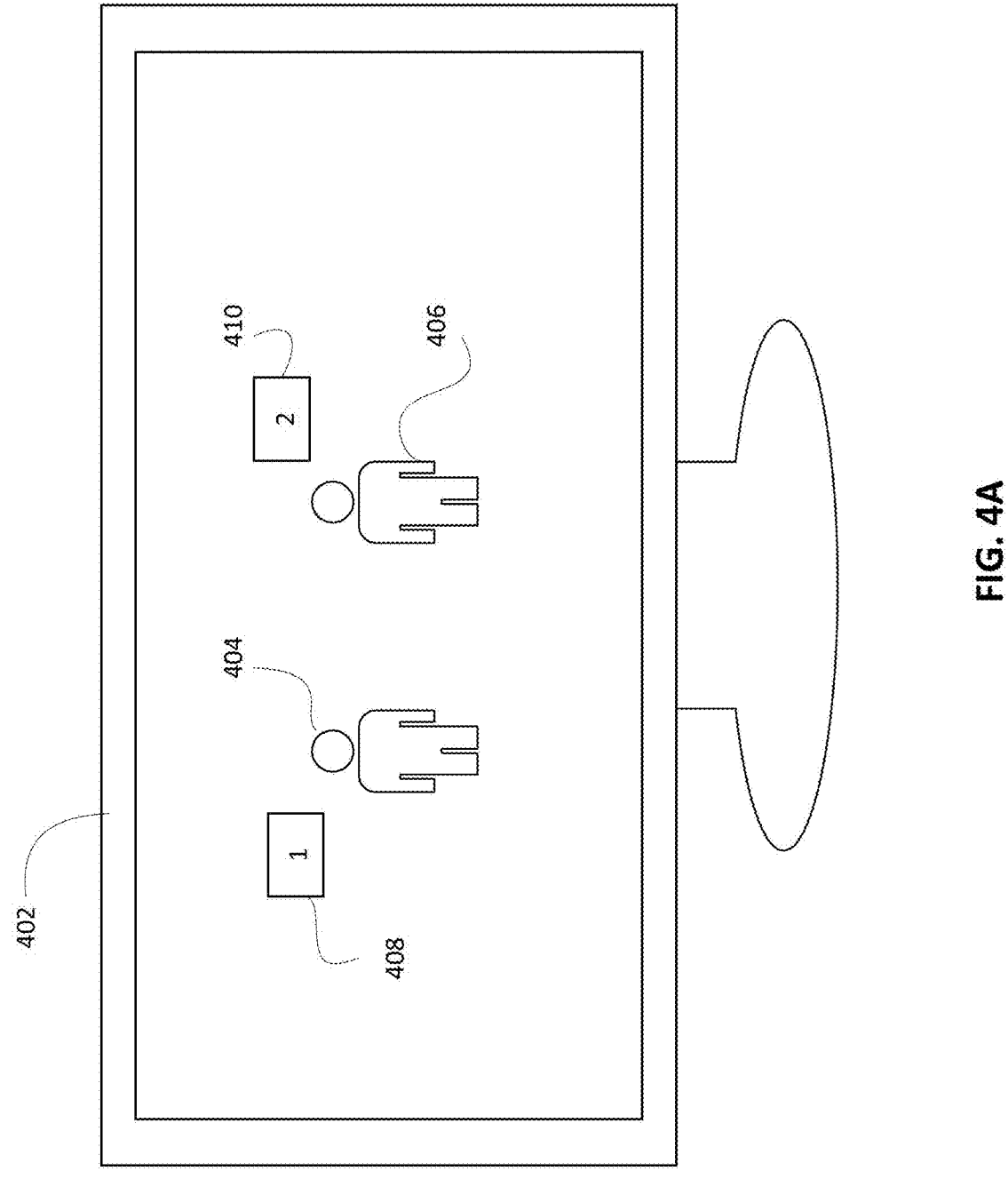
FIG. 4A-4C depict block diagrams illustrating example display of media information according to aspects of the disclosure.

FIG. 4A depicts a block diagram illustrating an example display of media information. According to an embodiment, the media information display system may play media content on a display screen 402. The media content can include, for example, television shows, movies, news, sports games, advertisements, and any other types of entertainment or media content that can be broadcast to a display screen. Person 404 and person 406 may be individuals appearing in the media content. The media information display system may receive metadata about the media content from a database and identify person 404 and person 406 based on the metadata. The media information display system may use a variety of annotations corresponding to each person. The annotations may include numbers, icons, letters, etc. The annotations can be specific to person 404 or person 406, such as an icon relating to their profession or a number or color that corresponds to the number/color on their uniforms or jerseys if they are sports players. In some examples, the annotations may be assigned based on popularity. If person 404 is more popular than person 406, then the media information display system may display the number "1" (icon 408) next to person 404. Similarly, the media information display system may assign the number "2" (icon 410) to person 406 and display the number "2" next to person 406 on the display screen 402. It should be understood that the annotation or icon can be generated based on any information relative to the person or object shown, or it may be a general annotation or icon.

According to some examples, the media information display system may display icon 408 and icon 410 in the locations that would least obscure the view of the viewer(s). For example, if person 404 is surrounded by other persons on media content or other important objects, icon 408 may be displayed relatively far from person 404 so as not to obscure the viewer's view with respect to person 404's surrounding region. In some examples, the size of icon 408 and icon 410 may each be different. For example, the size of the icon may be relative to the respective amount of space available for displaying the icon. If the amount of space for icon 408 is smaller than the amount of space for icon 410, then icon 408 may be displayed smaller than the icon 410. If an amount of space between person 406 and person 408 is determined to be sufficient for displaying both icons 408 and 410, both icons may be displayed in the space between person 404 and person 406. According to some examples, the least obscuring areas of the frame may be determined using color histograms (not shown) that lay out the distribution of important objects or persons within the frame. Areas dominated by a particular color range may then be used as the area for displaying icon 408 and icon 410. For example, a green color may indicate that the area is not congested with objects or persons within the frame. Icon 408 and icon 410 may be placed in the green region. Continuing this example, a red color may indicate that the area is congested with many objects or persons, and thus, the media information display system may avoid displaying icon 408 and icon 410 in the red region. The locations of icon 408 and icon 410 may dynamically change as person 404 and person 406 move to different regions on the display screen 402.

Figure 4B:
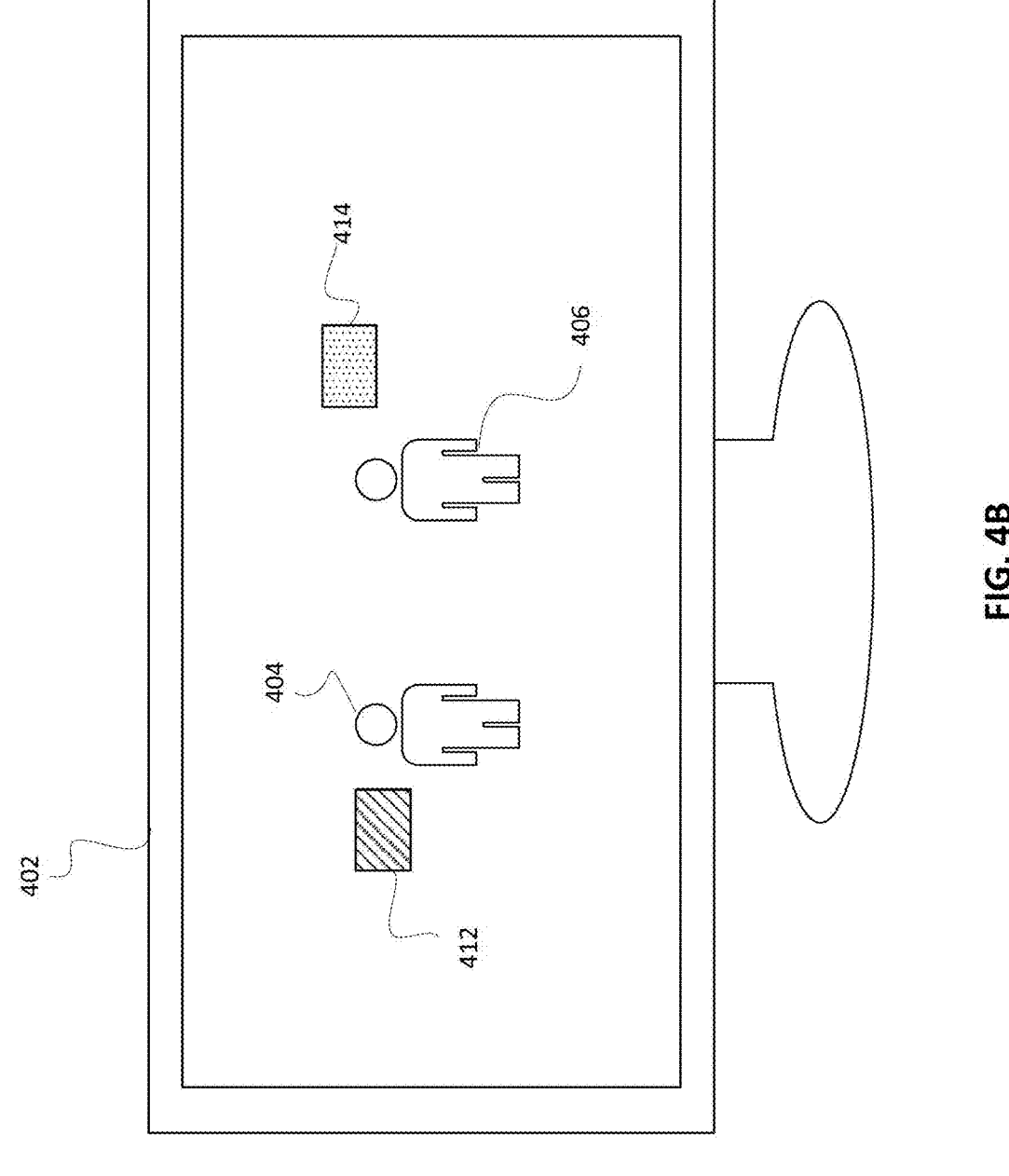

FIG. 4B depicts a block diagram illustrating another example display of media information. As described above in connection with FIG. 4A, display screen 402 may display the media content and display person 404 and person 406 in a particular frame of the media content. For example, display screen 402 may display a live soccer game, and person 404 and person 406 may be soccer players. As the viewer watches the soccer game on the display screen 402, icon 412 and icon 414 may be displayed near person 404 and person 406.

Icon 412 and icon 414 may be temporarily displayed for a finite period of time after the first appearance of person 404 and person 406. Alternatively, icon 412 and icon 414 may stay on the screen for the entire duration of the game and follow person 404 and person 406. The media information display system may enable the viewer to turn on or off icon 412 and icon 414 using a remote controller or any other type of user device.

According to some examples, icon 412 may be a national flag corresponding to the nationality of person 404, and icon 414 may be a national flag corresponding to the nationality of person 406. In some other examples, icon 412 and icon 414 may represent other objects different from national flags. For example, the media information display system may analyze the profile of the viewer and historical data pertaining to the user's preferences or the search queries in the past to identify objects or themes that the viewer may have an interest in. For example, if the media information display system determines that the viewer is interested in the soccer shoes that the professional soccer players wear, the media information display system may display a small-sized picture of the soccer shoes that person 404 wears as icon 412 and those of person 406 as icon 414. The viewer may view icon 412 and icon 414 and try to search the price of the soccer shoes represented by icon 412 by using a voice recognition technique. For example, the view may say "Show me the prices of the soccer shoes that person 404 is wearing". In response to the query, the media information display system may perform a search on the Internet in the background and select the top results of the query without pausing the media content. The media information display system may display the top results of the query on an overlay display as described in more detail below.

According to some examples, the media information display system may learn the user preferences and areas of particular interest and store such data in a local database. The database may be updated at certain intervals such as when the media player boots, or when a particular program is selected on a streaming media platform. When such a program is selected, information about the specific persons appearing in the program may be populated in the database.

The media information display system may also perform searches in two parallel streams. In the first stream, when the user clicks or touches an icon or uses a voice recognition technique to obtain additional information, the media information display system may first look for the additional information in the local database and display the additional information on an overlay display. In the second stream, the media information display system may obtain a crop location such as bounding box coordinates based on the detected persons or objects of interest on the screen. The information related to the crop location may be provided to a search engine in the background. The top search results related to the persons or objects included in the crop location may be retrieved in the background and displayed on an overlay display. The top search results for the additional information may be stored in the local database and the user's preferences information can be updated based on the search results. The above two streams can take place in parallel simultaneously or separately.

Enhanced processing capabilities of the media system allow for performing the search in the background while the media content continues to play. As a result, the viewer experience is improved as the viewer can obtain details related to the persons or objects displayed without pausing or obscuring the media content. Moreover, because the content does not need to be paused to launch a separate feature or application, total viewing time can be reduced thereby conserving power to the display.

Figure 4C:
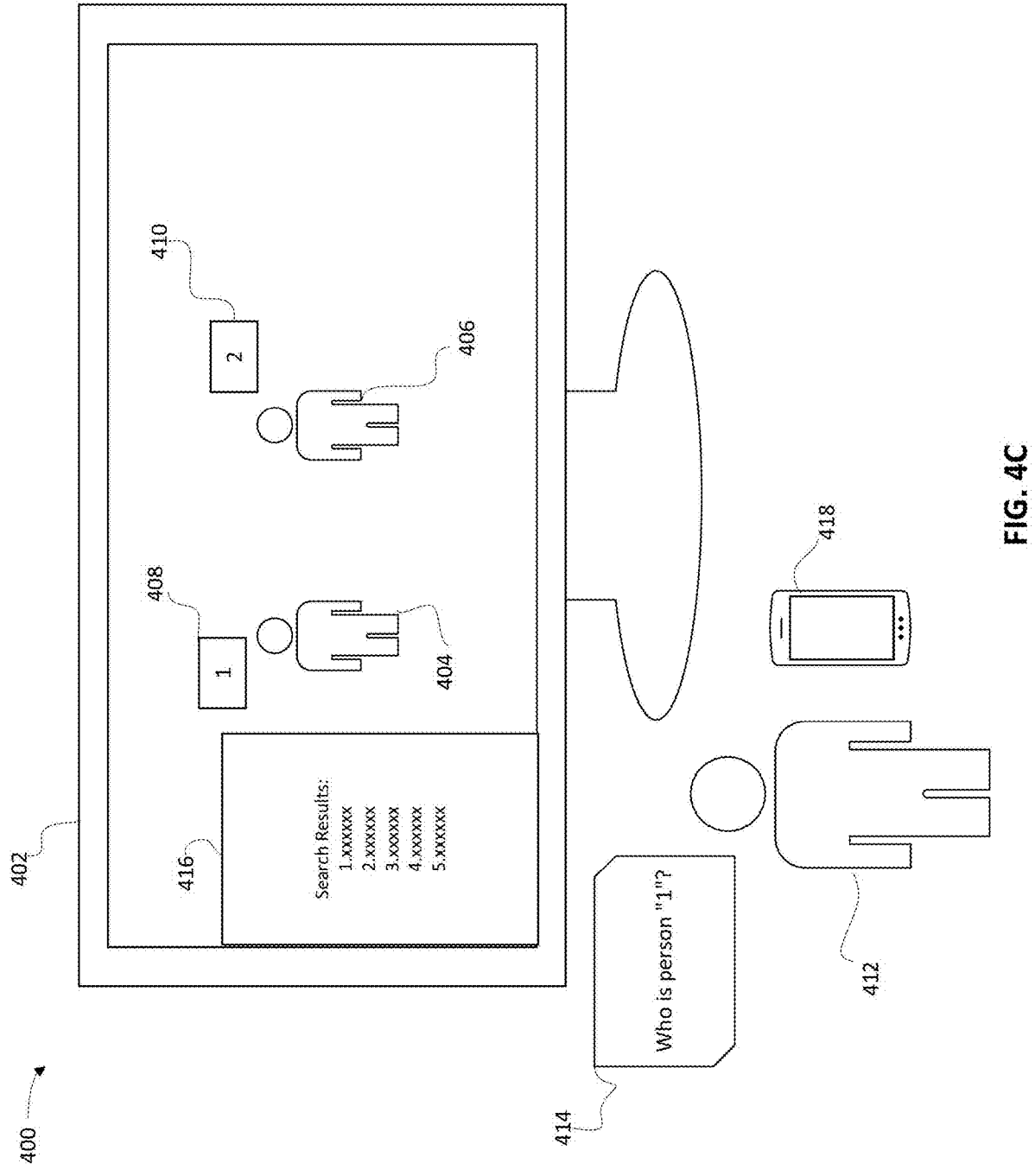

FIG. 4C depicts a block diagram illustrating an overlay display showing search results for the media content viewer's search queries. In this example, viewer 412 is viewing media content being played on the display screen 402. As described in connection with FIG. 4A, icon 408 is associated with person 404, and icon 410 is associated with person 406. Viewer 412 may not know or does not have much information about person 404, thus, viewer 412 may want to provide a voice search query 414, "Who is person 1?" Once the media display system receives the voice search query 414, the media display system may search the information on the Internet in the background. The media information display system may then provide search results using an overlay display 416. For example, the results may be depicted in an expanded list with the key information of person 404, or in any other format. According to some examples, the search results displayed in overlay display 416 may be sent to a personal electronic device 418 associated with viewer 412, such as via a push notification. The personal electronic device 418 may be, by way of example only, a tablet, laptop, smartphone, smartwatch, or any other type of wearable device or personal computing device. Such search results may additionally or alternatively be sent to viewer 412 via email, or via an associated application launched on the portable electronic device. In examples where multiple viewers are watching the content, the results may be sent to all viewers or selected viewers. The selected viewers may include, for example, only the viewer that submitted the voice query, viewers determined to be present, viewers that were specified by input to the system, etc.

According to some examples, the media information display system may provide specific options to viewer 412 after receiving the voice search query 414. For example, after the media information display system receives the query "Who is person 1?", the media information system may provide options for sub-queries. Such sub-queries may be automatically generated in real-time using machine learning models. Sub-queries may be pre-programmed queries retrievable from previously stored data. For example, the sub-queries may include "Please find this person on SMS", "Please find the latest news on his person", etc. Viewer 412 may choose one of the above sub-queries by, for example, voice command, gaze selection, manual input on a remote controller, manual input through a personal portable electronic device, etc.

According to some examples, the media information display system may automatically provide additional information on person 404 when viewer 412 pauses the media content without providing voice search query 414. For example, the additional information may be adapted to the personal interest of viewer 412 based on viewer 412's profile or historical data. The media information display system may provide the top five movies or television shows that person 404 appeared in the past, charitable links that person 404 is connected to, the product that person 404 has endorsed, career achievements of person 404, links to person 404's social media sites, or the most popular forums person 404 appears in, etc.

The media information display system may accurately determine the timing of the search query. For example, in the case of voice search, the audio level may be monitored, and the moment an increase in viewer 412's volume may be determined to be the accurate timing of the voice search query.

According to some examples, when viewer 412 presses the pause button, the frame information may be recorded and analyzed to determine whether a major change in the frame occurs. When such major frame changes are identified, the media information display system may predict which sequence of subsequent frames will be most likely interesting to viewer 412.

According to some examples, overlay display 416 may include different options for further search such as account information of person 404, links to person 404's social media, webpages related to person 404, and links to online videos or related video platforms. The media information display system may dynamically change icon 408 as the frames of the media content change. Icon 408 may be changed to depict social media site logos.

According to some examples, viewer 412 may issue a voice command such as "search for that person" without specifying icon 408 or referring to person 404 in any manner. In such cases, the media information display system may detect person 404. For example, the system may determine that the voice command prefers person 404 based on the placement of the person on the screen, when the person in the content speaks or otherwise commands attention, when the person appears in the display, any descriptive indicators included in the voice command (e.g., "search for that person wearing the blue shirt"), by analyzing the gaze direction of viewer 412 using a camera or any type of visual sensor configured to detect a movement of human pupils, etc. Once identifying the person referenced by the viewer's command, the system may determine who the person is, such as by using facial recognition techniques, image comparison searching, etc. The system may access a webpage or social media site to provide high-level information about person 404 on overlay display 416. Overlay display 416 may be located in the area where the viewer's 412's view is not obscured. For example, overlay display 416 may be displayed in the corner and located away from person 404 and person 406. Moreover, the location of overlay display 416 may be dynamically adjusted as the locations of person 404 and person 406 change to different locations in different frames. The location of overlay display 416 may also be adjusted based on the change in the gaze direction of viewer 412.

While the examples above describe providing information related to a person depicted in the content, the media system may additionally or alternatively identify and provide information about objects displayed. For example, such objects may include articles of clothing or footwear worn by a person in the content, furniture or décor depicted in a background of the content, cars or motorcycles or other vehicles shown, or any of a variety of other types of objects. The information obtained during the background search may include the name or brand of the object, where the object can be purchased, a price, etc.

Figure 5:
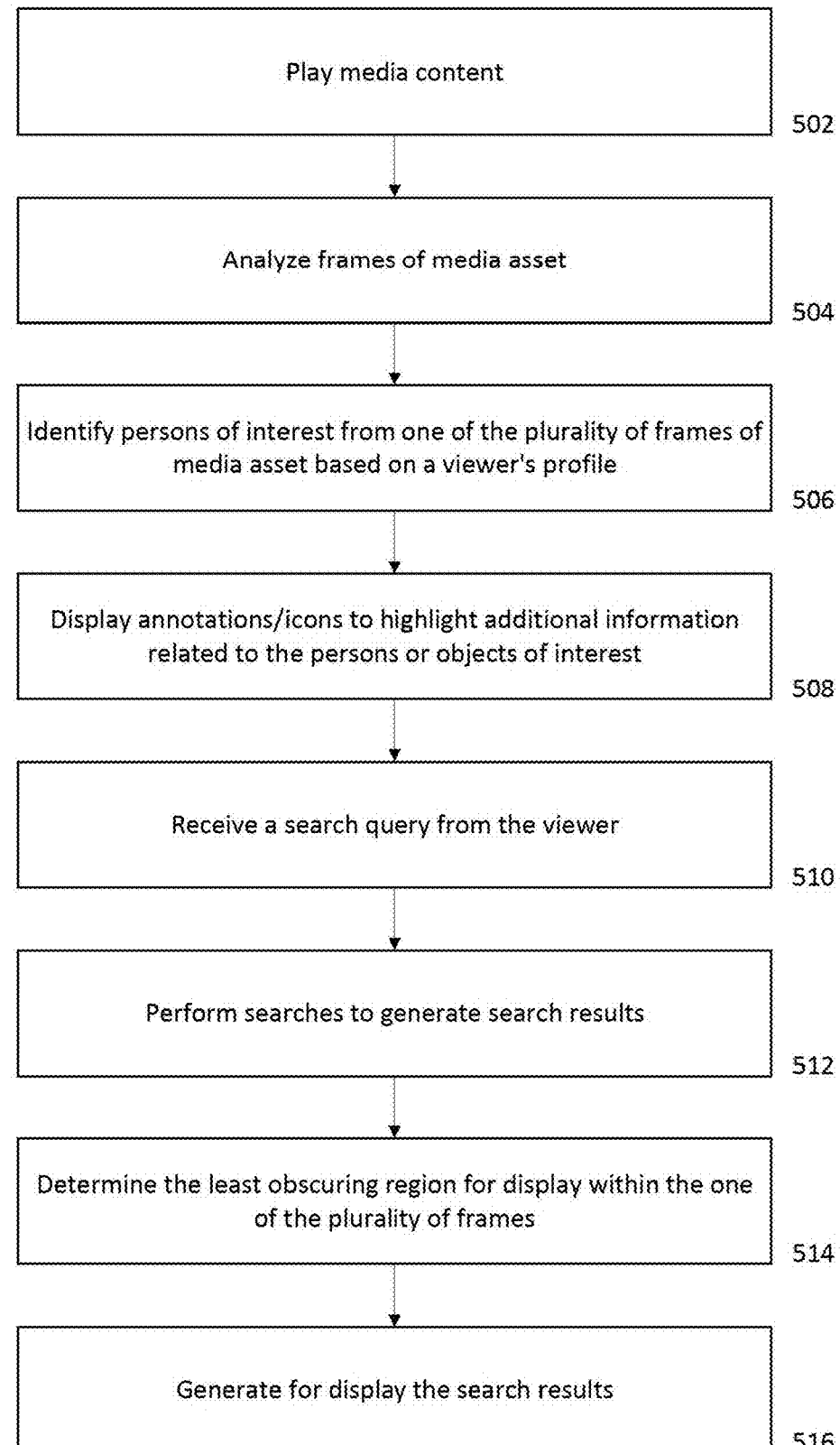
FIG. 5 depicts a flow diagram illustrating an example media information displaying process according to aspects of the disclosure.

FIG. 5 depicts a flow diagram illustrating an example media information displaying process. According to block 502, the media information display system may play media content. Media content may include movies, television shows, news, podcasts, advertisements, sports games, reality shows, interviews, and any other type of media content that may be played on electronic devices such as a television, laptop, tablet, smartphone, wearables, or any other types of electronic devices configurable to play and display media content.

According to block 504, the media information display system may perform object recognition within a plurality of frames included in the media content. The media information display system may analyze a frame or a group of frames and determine whether the frames contain objects or persons of interest to a viewer.

According to block 506, the media information display system may identify one or more objects or persons that may be interesting to the viewer based on the viewer's past interaction with the same or similar media content. For example, the media information display system may determine whether the viewer pressed the pause button or used a voice command to pause the media content at a certain frame where particular objects or persons appear. The media information display system may access the database storing the viewer's information to retrieve the information relating to the viewer's personal interest. For example, if a viewer has a great interest in sneakers and a particular movie star, the media information display system may identify a frame whether said particular movie star appears wearing particular sneakers.

According to block 508, the media information display system may display annotations or icons to highlight that additional information related to the persons or objects of interest is available. Icons may depict a picture of sneakers to indicate that the additional information relating to the sneakers is available.

According to block 510, the media information display system receives a search query as to the displayed annotations or icons from the viewer. The search queries may comprise a voice search query provided by the viewer without pausing the media content or a query transmitted via a remote controller, smartphone, laptop, or any other compatible electronic device.

According to block 512, the media information display system may perform searches. The media information display system may search on the Internet or the movie star's social media sites. The media information display system may summarize the information found. The media information display system may perform searches and summarize the search results in the background of the media content without pausing the media content.

According to block 514, the media information display system may determine the least obscuring region for display. The media information display system may place an overlay display of the search results toward the extremities of the respective frame with a low opacity line linking to the objects or persons of interest. Such linked lines may be configured to be disabled in response to a viewer request. According to some other examples, the location of the overlay display may be adjusted based on the gaze direction of the viewer. The gaze direction of the viewer may be constantly monitored by the media information display system. For example, if the viewer is looking at the right side of the frame, the additional information including the search result may be displayed on the opposite side of the frame so as not to obscure the view of the viewer in the right direction. The size of the overlay display may also be dynamically adjusted.

According to block 516, the media information display system may generate for display the search results. The media information display system may display the search results in the lesser obscuring regions determined at the preceding block. The media information display system may determine the length of the display based on the length of the current frame. According to some examples, the media information display system may continue to display the same search result until a major change occurs in the current or subsequent frames. For example, when a soccer player scores and the replay is being played, the media information display system may discontinue displaying the search results so as not to obscure the viewer's views.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

Although the technology herein has been described with reference to particular examples, it is to be understood that these examples are merely illustrative of the principles and applications of the present technology. It is therefore to be understood that numerous modifications may be made and that other arrangements may be devised without departing from the spirit and scope of the present technology as defined by the appended claims.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A system for providing details about a person or object depicted in media content while media content is being played, the system comprising:
   memory; and
   one or more processors configured to:
      identify one or more persons or objects of interest depicted in the media asset;
      generate for display annotations related to the identified one or more persons or objects of interest, wherein the annotations are displayed within a first overlay region on a display screen using icons, avoiding areas that obscure a view of the identified one or more persons or objects while the media continues to play, wherein the icons indicate that details related to the one or more persons or objects are available;
      receive a request from a user for the details;
      access the details while the media content continues to play;
      determine a second overlay region for a display of the details on the display screen, wherein the second overlay region excludes the areas that obscure the view of the identified one or more persons or objects; and
      display the details in the determined second overlay region on the display screen while the media content continues to play.

2. The system of claim 1, wherein generating the annotations comprises:
   identifying the first overlay region on the display screen, relative to the person or objects, wherein the first overlay region minimally obscures the one or more persons or objects of interest and other persons or objects; and
positioning the annotations in the first overlay region.

3. The system of claim 1, wherein generating the annotations comprises selecting the icons based on relevance to the one or more persons or objects.

4. The system of claim 1, wherein the annotations include, bounding boxes and segmentation maps.

5. The system of claim 1, wherein the one or more persons or objects of interest are determined based on the user's preference data.

6. The system of claim 1, wherein the one or more persons or objects of interest are determined using an object recognition technique within a frame selected by the user's pressing a pause button on a remote controller.

7. The system of claim 1, wherein the search results are personalized based on the user's historical data.

8. The system of claim 1, wherein the first overlay region and the second overlay region for display are dynamically adjusted as the plurality of frames changes to another frame based on locations of the one or more persons or objects, background objects and a gaze direction of the user.

9. The system of claim 1, wherein the search query comprises a voice command.

10. The system of claim 1, wherein the search query is received using an interactive display system.

11. A method for providing details about a person or object depicted in media content while media content is being played, the method comprising:
   identifying one or more persons or objects of interest depicted in the media asset;
   generating for display annotations related to the identified one or more persons or objects of interest, wherein the annotations are displayed within a first overlay region on a display screen using icons, avoiding areas that obscure a view of the identified one or more persons or objects while the media continues to play, wherein the icons indicate that details related to the one or more persons or objects are available;
   receiving a request from a user for the details;
   accessing the details while the media content continues to play;
   determining a second overlay region for a display of the details on the display screen, wherein the second overlay region excludes the areas that obscure the view of a the identified one or more persons or objects; and
   displaying the details in the determined second overlay region on the display screen while the media content continues to play.

12. The method of claim 11, wherein generating the annotations comprises:
   identifying the first overlay region on the display screen, relative to the person or objects, wherein the first overlay region minimally obscure the one or more persons or objects of interest and other persons or objects; and
   positioning the annotations in the first overlay region.

13. The method of claim 11, wherein the generating the annotations comprises selecting the icons based on relevance to the one or more persons or objects.

14. The method of claim 11, wherein the annotations include, bounding boxes, and segmentation maps.

15. The method of claim 11, wherein the one or more person or objects of interest are determined based on the user's preference data.

16. The method of claim 11, wherein the one or more persons or objects of interest are determined using an object recognition technique within a frame selected by the user's pressing a pause button on a remote controller.

17. The method of claim 11, wherein the search results are personalized based on the user's historical data.

18. The method of claim 11, wherein the first overlay region and the second overlay region for display are dynamically adjusted as the plurality of frames changes to another frame based on locations of the one or more persons or objects, background objects and a gaze direction of the user.

19. The method of claim 11, wherein the search query is received using an interactive display system.

20. A non-transitory computer-readable medium storing instructions executable by one or more processors for performing a method for providing details about a person or object depicted in media content while media content is being played, the method comprising:

identifying one or more persons or objects of interest depicted in the media asset;

generating for display annotations related to the identified one or more persons or objects of interest, wherein the annotations are displayed within a first overlay region on a display screen using icons, avoiding areas that obscure a view of the identified one or more persons or objects while the media continues to play, wherein the icons indicate that details related to the one or more persons or objects are available;

receiving a request from a user for the details;

accessing the details while the media content continues to play;

determining a second overlay region for a display of the details on the display screen, wherein the second overlay region excludes the areas that obscure the view of the identified one or more persons or objects; and displaying the details in the determined second overlay region on the display screen while the media content continues to play.

* * * * *